United States Patent
Kamimura et al.

(10) Patent No.: US 9,938,172 B2
(45) Date of Patent: Apr. 10, 2018

(54) WASTEWATER TREATMENT DEVICE

(75) Inventors: Kazuhide Kamimura, Hyogo (JP);
Takuhiro Maeda, Hyogo (JP);
Morikata Nishida, Hyogo (JP);
Kosuke Shigiishi, Hyogo (JP); Seiichi Terakura, Tokyo (JP); Hideo Suzuki, Tokyo (JP); Gaku Kondo, Tokyo (JP)

(73) Assignee: MITSUBISHI HITACHI POWER SYSTEMS ENVIRONMENTAL SOLUTIONS, LTD, Yokohama-shi (JP)

( * ) Notice: Subject to any disclaimer, the term of this patent is extended or adjusted under 35 U.S.C. 154(b) by 301 days.

(21) Appl. No.: 14/358,169

(22) PCT Filed: Apr. 10, 2012

(86) PCT No.: PCT/JP2012/059742
§ 371 (c)(1),
(2), (4) Date: Jul. 3, 2014

(87) PCT Pub. No.: WO2013/099306
PCT Pub. Date: Jul. 4, 2013

(65) Prior Publication Data
US 2014/0319031 A1    Oct. 30, 2014

(30) Foreign Application Priority Data
Dec. 28, 2011  (JP) .................. 2011-290161

(51) Int. Cl.
*C02F 3/12* (2006.01)
*C02F 9/14* (2006.01)
(Continued)

(52) U.S. Cl.
CPC .............. *C02F 3/006* (2013.01); *C02F 3/04* (2013.01); *C02F 3/06* (2013.01); *C02F 3/1226* (2013.01);
(Continued)

(58) Field of Classification Search
CPC .... C02F 3/302; C02F 3/2806; C02F 2209/40; C02F 3/006; C02F 3/04; C02F 3/06; C02F 3/1226; C02F 3/1268; C02F 3/1273
(Continued)

(56) References Cited

U.S. PATENT DOCUMENTS

| | | | |
|---|---|---|---|
| 4,568,464 A * | 2/1986 | Blay ................. | C02F 3/006 210/143 |
| 5,616,241 A * | 4/1997 | Khudenko ............ | C02F 3/006 210/151 |
| 2005/0211629 A1* | 9/2005 | Isaka ................. | C02F 3/302 210/621 |

FOREIGN PATENT DOCUMENTS

JP   62-204897 A   9/1987
JP   05-317884 A   12/1993
(Continued)

OTHER PUBLICATIONS

Koresuke, JP 2004-148145 English machine Translation, May 27, 2004, pp. 1-7.*
(Continued)

*Primary Examiner* — Claire A Norris
(74) *Attorney, Agent, or Firm* — Westerman, Hattori, Daniels & Adrian, LLP (57) ABSTRACT

A wastewater treatment device includes a first biological treatment device (10) that treats wastewater through a membrane-separated activated sludge method; a second biological treatment device (20) that treats wastewater through a biofilm method; measurement units (31, 32) that measure load concentration and flow rate in the wastewater flowing upstream of the first biological treatment device (10) and the second biological treatment device (20); and a control unit (30) that calculates a load quantity from the load concentration and the flow rate, determines, according to the load quantity, a distribution ratio between a flow rate of the
(Continued)

wastewater supplied to the first biological treatment device (10) and a flow rate of the wastewater supplied to the second biological treatment device (20), and adjusts the flow rate of the wastewater supplied to the first biological treatment device (10) and the second biological treatment device (20), based on the distribution ratio.

7 Claims, 5 Drawing Sheets

(51) Int. Cl.
*C02F 3/00* (2006.01)
*C02F 3/06* (2006.01)
*C02F 3/04* (2006.01)
*C02F 103/34* (2006.01)
*C02F 1/32* (2006.01)
*C02F 1/46* (2006.01)
*C02F 1/66* (2006.01)

(52) U.S. Cl.
CPC .......... *C02F 3/1268* (2013.01); *C02F 3/1273* (2013.01); *C02F 1/32* (2013.01); *C02F 1/4604* (2013.01); *C02F 1/4608* (2013.01); *C02F 1/66* (2013.01); *C02F 2103/34* (2013.01); *C02F 2209/001* (2013.01); *C02F 2209/08* (2013.01); *C02F 2209/20* (2013.01); *C02F 2209/40* (2013.01); *Y02W 10/15* (2015.05)

(58) Field of Classification Search
USPC ............................................ 210/195.1, 96.2
See application file for complete search history.

(56) References Cited

FOREIGN PATENT DOCUMENTS

| | | |
|---|---|---|
| JP | 07-116639 A | 5/1995 |
| JP | 09-206793 A | 8/1997 |
| JP | 11-244896 A | 9/1999 |
| JP | 2001-276867 A | 10/2001 |
| JP | 2001-334282 A | 12/2001 |
| JP | 2002-219481 A | 8/2002 |
| JP | 2004-148145 A | 5/2004 |
| JP | 2005-211788 A | 8/2005 |
| WO | 2007/029509 A1 | 3/2007 |

OTHER PUBLICATIONS

Nonaka, JP 2001-334282 English Machine Translation, Dec. 4, 2001, pp. 1-13.*
Decision to Grant a Patent dated Mar. 15, 2016, issued in counterpart Japanese Patent Application No. 2011-290161. Concise explanation of relevance: "The Decision to Grant a Patent has been received". (3 pages).
International Search Report, dated Jul. 17, 2012, issued in corresponding application No. PCT/JP2012/059742.
Written Opinion, dated Jul. 17, 2012, issued in corresponding application No. PCT/JP2012/059742.
Notification of the Decision to Grant dated Sep. 30, 2015, issued in counterpart in Chinese Patent Application No. 201280056106.2 with English translation. (2 pages).
Notice of Eligibility for Grant dated Nov. 16, 2016, issued in counterpart Singapore Patent Application No. 11201402216W. (5 pages). Explanation of Relevance: "The Notice of Eligibility for Grant has been received".

* cited by examiner

WASTEWATER TREATMENT DEVICE

TECHNICAL FIELD

The present invention relates to a wastewater treatment device for purifying and treating industrial wastewater to recycle the industrial wastewater.

BACKGROUND ART

Industrial wastewater from plants is subjected to purifying treatments, such as elimination of heavy metal components, suspended particles, and the like and decomposition and elimination of organic matter using microorganisms. Although the treated water subjected to the purifying treatment is generally discharged into environment, the treated water obtained by subjecting the industrial wastewater to the purifying treatment is recycled for industrial water purpose in places where securing industrial water is difficult.

As methods of decomposing and eliminating organic matter by microorganisms, a membrane-separated activated sludge method (membrane bioreactor (MBR)) and a biofilm method (biofilm reactor (BFR)) are used.

The membrane-separated activated sludge method is a method of decomposing organic matter in wastewater using activated sludge within a tank, and separating treated water and the activated sludge using a filtration membrane. Since the membrane-separated activated sludge method can make the concentration of the activated sludge high and make a settling tank separating the treated water and the activated sludge unnecessary, there is an advantage of volumetric efficiency being high. Meanwhile, if water quality, that is, organic matter concentration in the wastewater fluctuates largely in a short period of time, treatment capacity cannot follow fluctuations of the organic matter concentration, and the organic matter concentration in the treated water may exceed a control value.

The biofilm method is a method of making the activated sludge adhere to a carrier surface in the shape of a film, and decomposing the organic matter in the wastewater. Although the same treatment as the usual activated sludge is performed on the film (biofilm) surface, since a source of nutrition is insufficient in the inner surface of the film, the organic matter is brought into a dormant state. When the organic matter concentration fluctuates, the sludge inside the biofilm is activated. That is, the thickness of active sludge fluctuates according to fluctuations of the organic matter concentration. Since the amount of the activated sludge according to the organic matter concentration is maintained, it is possible to continue the treatment corresponding to the fluctuations of the organic matter concentration.

In wastewater treatment devices, generally, any one of the membrane-separated activated sludge method and the biofilm method is applied. PTL 1 discloses a water treatment device that includes a biological treatment tank and that can cope with a case where the time-series fluctuations of the flow rate of the water to be treated are large. In the water treatment device of PTL 1, the water before treatment is taken into a flow rate regulating tank, and the flow rate of the water sent to biological treatment means and the water sent to ozonizing means is controlled according to the pollution loading amount of the water in the flow rate regulating tank.

CITATION LIST

Patent Literature

[PTL 1]: Japanese Unexamined Patent Application Publication No. 11-244896 (Claim 1, Paragraphs [0015] to and [0029] to [0032], and FIG. 1)

SUMMARY OF INVENTION

Technical Problem

Since the flow rate regulating tank that temporarily stores the wastewater is required in the water treatment device of PTL 1, the volumetric efficiency of the device is poor. Additionally, the ozonization is expensive. Moreover, there is a problem that an auxiliary facility for preventing ozone leak is separately required, and management, such as monitoring for the ozone leak, becomes complicated.

An object of the invention is to provide a wastewater treatment device that can stably treat wastewater by means of a simple device even if water quality fluctuations are large.

Solution to Problem

To solve the above problems, there is provided a wastewater treatment device including a first biological treatment device that treats wastewater through a membrane-separated activated sludge method; a second biological treatment device that treats wastewater through a biofilm method; measurement units that measure load concentration and flow rate in the wastewater flowing upstream of the first biological treatment device and the second biological treatment device; and a control unit that calculates a load quantity from the load concentration and the flow rate, determines, according to the load quantity, a distribution ratio between a flow rate of the wastewater supplied to the first biological treatment device and a flow rate of the wastewater supplied to the second biological treatment device, and adjusts the flow rate of the wastewater supplied to the first biological treatment device and the flow rate of the wastewater supplied to the second biological treatment device, based on the distribution ratio.

In this case, the load quantity is COD or BOD.

As described above, the treatment device using the membrane-separated activated sludge method cannot follow its treatment capacity when the water quality of the wastewater fluctuates in a short time. In contrast, the treatment device using the biofilm method can fluctuate its treatment capacity according to fluctuations of water quality. In the wastewater treatment device of the invention, decomposition treatment of organic matter is performed using the aforementioned feature and using the membrane-separated activated sludge method and the biofilm method together. At this time, the load concentration and the flow rate in the wastewater are monitored, the distribution ratio of the wastewater to the treatment devices adopting the respective methods is determined based on the load quantity calculated from the load concentration and the flow rate, and the flow rates of the wastewater supplied to the respective treatment devices are controlled based on the distribution ratio. By adopting the aforementioned process, it is possible to prevent a situation in which the wastewater including the load quantity exceeding the treatment capacity flows into the treatment device using the membrane-separated activated sludge method, and organic matter in the water after treatment exceeds a control value. The wastewater treatment device of the invention can cope with fluctuations of water quality, and can continue stable wastewater treatment.

In the aforementioned invention, the control unit stores a first threshold value, the control unit supplies the wastewater to the first biological treatment device and stops the supply of the wastewater to the second biological treatment device when the load quantity is equal to or smaller than the first threshold value, and the control unit supplies the wastewater to the first biological treatment device and the second biological treatment device in a predetermined distribution ratio when the load quantity is larger than a first threshold value.

In the aforementioned invention, the control unit stores the first threshold value and a second threshold value, the control unit supplies the wastewater to the first biological treatment device and the second biological treatment device in the predetermined distribution ratio when the load quantity is larger than the first threshold value and equal to or smaller than the second threshold value, and the control unit supplies the wastewater to the first biological treatment device so that a treatment quantity of the first biological treatment device reaches a predetermined value and supplies the remaining wastewater to the second biological treatment device when the load quantity is larger than the second threshold value.

In the wastewater treatment device of the invention, the wastewater is mainly treated by the treatment device (first biological treatment device) using the membrane-separated activated sludge method. In the membrane-separated activated sludge method, if the load concentration in a system becomes extremely low, some microorganisms become extinct and the activity of sludge decreases substantially. When the load concentration becomes increased in this state, treatment cannot follow the load fluctuation. For this reason, when the load quantity becomes low (equal to or smaller than the first threshold value), in the invention, the operation of the second biological treatment device is stopped and the load concentration in which the first biological treatment device can be stably operated is secured.

On the other hand, when the load quantity is large, the amount of the wastewater exceeding the treatment quantity of the first biological treatment device is supplied to the treatment device (second biological treatment device) using the biofilm method. Otherwise, the first biological treatment device is operated in a predetermined load range, and the wastewater is supplied to the respective biological treatment devices in such a distribution ratio that the second biological treatment device bears a part of wastewater treatment.

Accordingly, the wastewater treatment device of the invention can perform stable wastewater treatment.

In the aforementioned invention, the control unit stores one or a plurality of intermediate threshold values between the first threshold value and the second threshold value, and the control unit supplies the wastewater to the first biological treatment device and the second biological treatment device in different distribution ratios between case of a load quantity being larger than the intermediate threshold value and case of a load quantity being equal to or smaller than the intermediate threshold value.

In this case, preferably, the control unit supplies the wastewater so that the amount of the wastewater to the second biological treatment device increases whenever the load quantity exceeds the intermediate threshold value.

By adopting the aforementioned process, the followability of treatment to load fluctuations can be enhanced.

In the aforementioned invention, preferably, the wastewater discharged from the second biological treatment device is supplied to the first biological treatment device.

In the second biological treatment device using the biofilm method, suspended particles are easily generated. In the membrane-separated activated sludge method, microorganisms and treated water are separated into a solid and a liquid by a separation membrane. If the first biological treatment device is arranged downstream of the second biological treatment device, the suspended particles can be separated and eliminated from the treated water by the separation membrane of the first biological treatment device. For this reason, when desalination treatment is performed using a reverse osmosis membrane or an electrostatic desalinization device on the downstream side, the blockage inside a membrane module can be prevented.

In the aforementioned invention, preferably, the control unit calculates at least one of a moving average and a regression estimate of the load concentration, and calculates the load quantity using at least one of the moving average and the regression estimate.

If the moving average or the regression estimate is used, at the time the load concentration fluctuates abruptly in a short time or there is a measurement error in the load concentration, the amount of fluctuations is corrected. For this reason, since there is no need to determine the amount of distribution of the wastewater in accordance with very short-time fluctuations of the load concentration or measurement errors in the load concentration, the effect of stable control is shown.

Advantageous Effects of Invention

The treatment device of the invention uses together the biological treatment device using the membrane-separated activated sludge method and the biological treatment device using the biofilm method. The characteristics of the respective biological treatment devices are used, and the amount of distribution of the wastewater is controlled according to fluctuations of COD load quantity. For this reason, it is possible to cope with even a case where water quality fluctuations are severe, and the water quality of the treated water can be stabilized.

BRIEF DESCRIPTION OF DRAWINGS

FIGS. 3 (a), (b) and (c) are graphs showing time-dependent changes in the COD concentration and flow rate when wastewater is treated using a membrane-separated activated sludge treatment device and a biofilm treatment device.

FIGS. 4 (a) and (b) are graphs showing time-dependent changes in the COD concentration and flow rate when wastewater is treated using only the membrane-separated activated sludge treatment device.

DESCRIPTION OF EMBODIMENTS

Figure 1:
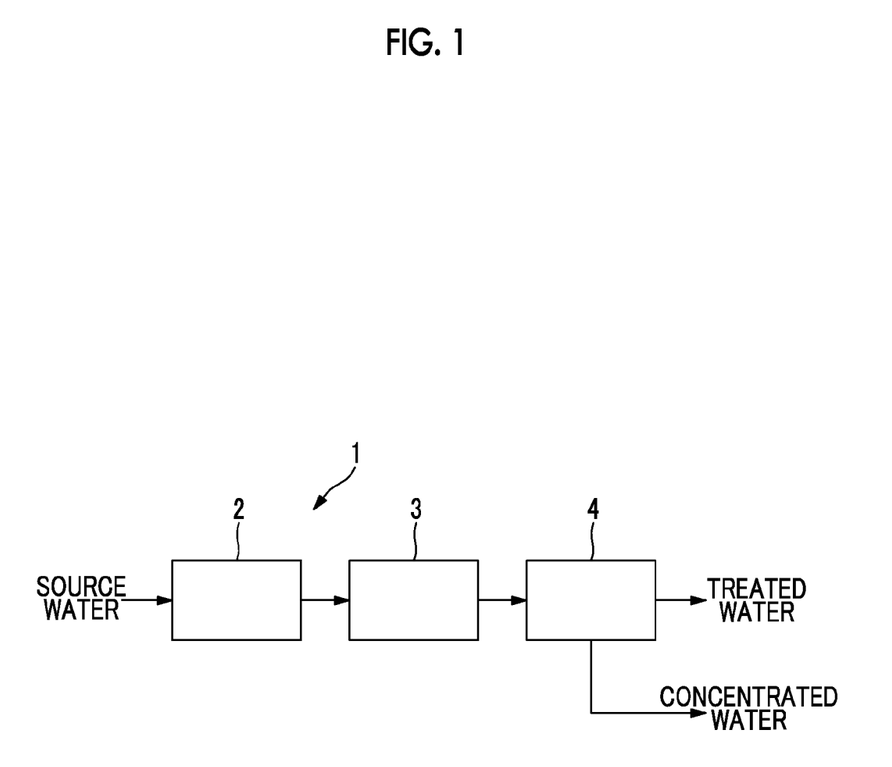
FIG. 1 is a block diagram of a wastewater treatment device.

A block diagram of a wastewater treatment device related to the present embodiment is shown in FIG. 1. The wastewater treatment device 1 includes a pretreatment unit 2, a biological treatment unit 3, and a desalinization unit 4 from an upstream side.

The pretreatment unit 2 receives source water from a plant, and eliminates oils, heavy metals, suspended particles, or the like in the source water.

The desalinization unit 4 eliminates ions contained in the wastewater. The desalinization unit 4 has a reverse osmosis membrane type desalinization device or an electrostatic desalinization device.

In the reverse osmosis membrane type desalinization device, a reverse osmosis membrane (RO membrane) allows only water to permeate therethrough. The water (treated water) that permeates through the reverse osmosis membrane is recycled as industrial water. Wastewater (concentrated water) in which ions are condensed is present on the upstream side of the reverse osmosis membrane. The concentrated water is discharged out of the system of the wastewater treatment device 1 by being discharged from the reverse osmosis membrane type desalinization device.

The electrostatic desalinization device has a pair of porous electrodes that face each other, an anion-exchange membrane is installed on a positive electrode side, and a cation-exchange membrane is installed on a negative electrode side. The wastewater is enabled to flow between the electrodes.

If an electric current is applied so that a positive electrode becomes plus and a negative electrode becomes minus, anions in the wastewater move to the positive electrode side, permeate through the anion-exchange membrane, and are adsorbed on the porous positive electrode. On the other hand, cations in the wastewater move to the negative electrode side, permeate through the cation-exchange membrane, and are adsorbed on the porous negative electrode. Accordingly, the ions in the wastewater are eliminated when flowing between the electrodes, and the treated water is recovered. The recovered treated water is recycled as the industrial water. It is advantageous to use the electrostatic desalinization device, since the recovery rate of water can be improved further than the reverse osmosis membrane type desalinization device When predetermined time has lapsed, water conduction is cut off, and the positive electrode is turned minus and the negative electrode is turned plus by reversing electric currents applied to the respective electrodes. By adopting the aforementioned process, the ions adsorbed on the porous electrodes are released, permeate through the ion exchange membranes, and are moved into the wastewater. Then, the wastewater containing the ions is discharged from the electrostatic desalinization device, and is discharged out of the system of the wastewater treatment device 1 as drain.

Figure 2:
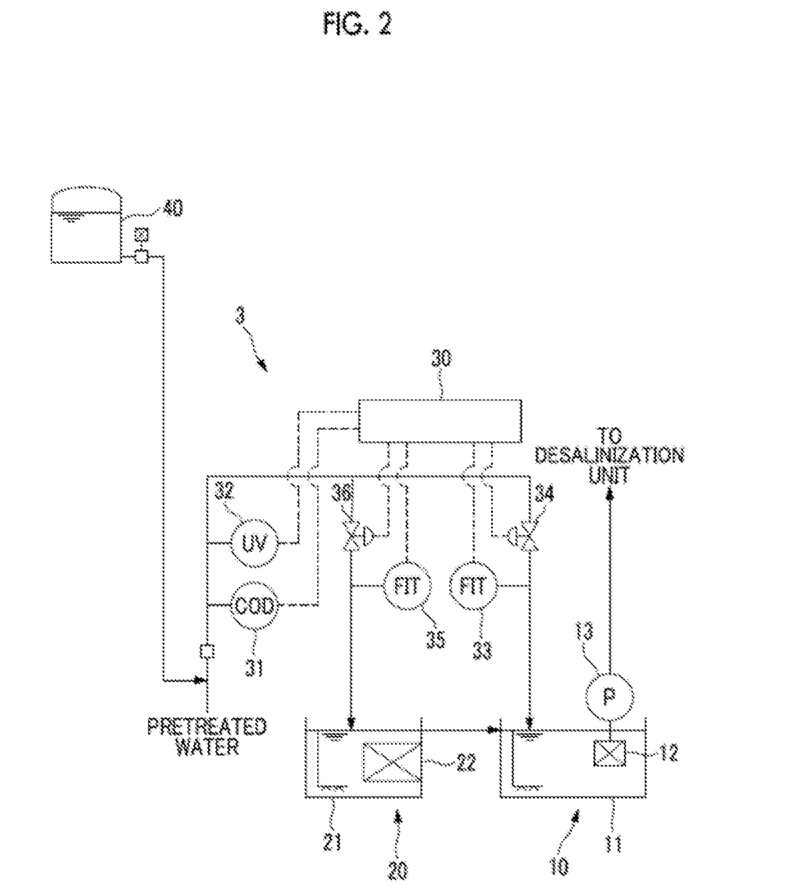
FIG. 2 is a schematic view of a biological treatment unit of the wastewater treatment device.

FIG. 2 is a schematic view of the biological treatment unit 3 of the wastewater treatment device related to the present embodiment. The biological treatment unit 3 includes a treatment device 10 (a first biological treatment device; hereinafter referred to as a membrane-separated activated sludge treatment device) to which the membrane-separated activated sludge method is applied, and a treatment device 20 (a second biological treatment device; hereinafter referred to as a biofilm treatment device) to which the biofilm method is applied, a measurement unit, and a control unit 30.

The membrane-separated activated sludge treatment device 10 includes a biological reactor 11 and a separation membrane 12. Activated sludge is accommodated in the biological reactor 11. Microorganisms (activated sludge) are brought into a suspended state in the wastewater of the biological reactor 11. The separation membrane 12 includes a microfiltration membrane, and has a hole of about 0.1 μm.

The separation membrane 12 is immersed in the wastewater in the biological reactor 11. The separation membrane 12 is connected to a pump 13.

The biofilm treatment device 20 includes a treatment tank 21 and a fixed bed 22. The fixed bed 22 is accommodated within the treatment tank 21. The fixed bed 22 has a configuration in which a carrier that carries a biofilm on a surface is housed within a vessel. As a predetermined amount of wastewater is taken into the vessel of the fixed bed 22, and the biofilm on the surface of the carrier and the wastewater come into contact with each other, decomposition of organic matter is performed. In the present embodiment, a trickling filter method, a rotary disc method, a contact aeration method, or the like can be adopted as the biofilm method. In addition, in the present embodiment, the carrier that carries the biofilm is not limited to the fixed bed, and a method of carrying a biofilm on the surface of a carrier (a size of about 3 mm to 10 mm) suspended in wastewater can also be adopted.

Valves 34 and 36 are respectively installed on inlet sides of the membrane-separated activated sludge treatment device 10 and the biofilm treatment device 20. The valves 34 and 36 are respectively connected to an output unit of the control unit 30. The membrane-separated activated sludge treatment device 10 and the biofilm treatment device 20 are connected by piping.

The measurement unit is constituted by a load concentration measurement unit that measures the load concentration in the wastewater, and a flow rate measurement unit that measures the flow rate of the wastewater.

In the present embodiment, chemical oxygen demand (COD) or biochemical oxygen demand (BOD) is used as the load measured by the load concentration measurement unit. The load concentration measurement unit includes a COD meter 31 and a UV meter 32. In addition, it is possible to convert COD measured in the COD meter into BOD. The load concentration measurement unit is installed near an inlet (the upstream side of the membrane-separated activated sludge treatment device 10 and the biofilm treatment device 20) of the biological treatment unit 3. The COD meter 31 and the UV meter 32 are connected to an input unit of the control unit 30. In addition, in the present embodiment, only any one of the COD meter 31 and the UV meter 32 may be installed as the load concentration measurement unit. Additionally, a TOC meter that measures total organic carbon (TOC) concentration may be installed in addition to the COD meter and the UV meter.

The biological treatment unit 3 of FIG. 2 includes a flow meter 33 installed at an inlet of the membrane-separated activated sludge treatment device 10 and a flow meter 35 installed at an inlet of the biofilm treatment device 20 as the flow rate measurement unit. However, the installation locations of the flow meters are not limited to FIG. 2, and the flow meters may be installed at the inlet of the membrane-separated activated sludge treatment device 10 and the inlet (specifically, near the COD meter 31 and the UV meter 32) of the biological treatment unit 3, or the inlet of the biofilm treatment device 20 and the inlet of the biological treatment unit 3. The flow meters 33 and 35 are respectively connected to the input unit of the control unit 30.

A neutralizing-chemical tank 40 is connected to piping on the upstream side of the COD meter 31 and the UV meter 32. The neutralizing-chemical tank 40 holds acid, such as HCl, or alkali, such as NaOH. Which one is used between acid or alkali changes depending on the characteristics of the wastewater. Two kinds of chemicals that are acids and alkali respectively may be stored in separate tanks depending on the characteristics, and may be properly used according to pH fluctuations. A predetermined amount of neutralizing chemical is supplied to the wastewater that has flowed into the biological treatment unit 3, and pH of the wastewater is adjusted.

In FIG. 2, the UV meter may be installed on a downstream side of the membrane-separated activated sludge treatment device 10, and the load concentration in the treated water treated by the biological treatment unit 3 may be measured.

The process of treating the wastewater in the biological treatment unit 3 of the present embodiment will be described below. A case where COD concentration is measured as the load concentration will be described below as an example.

The wastewater from which the heavy metals, oils, suspended particles, or the like in the wastewater are eliminated in the pretreatment unit 2 flows into the biological treatment unit 3.

The COD meter 31 measures the COD concentration in the wastewater, which has flowed into the biological treatment unit 3, at every predetermined time, for example, every hour. The COD meter 31 measures the COD concentration. The COD concentration measured in the COD meter 31 is transmitted to the control unit 30.

The UV meter 32 irradiates the wastewater that has flowed into the biological treatment unit 3 with ultraviolet light having a wavelength of 254 nm, and measures the absorbance of the wastewater. The measured absorbance is transmitted to the control unit 30.

The control unit 30 acquires the COD concentration measured by the COD meter 31 and the absorbance measured by the UV meter 32. The control unit 30 stores the correlation data between the absorbance measured by the UV meter 32 and the COD concentration in the wastewater in advance. The control unit 30 compares the acquired absorbance with the correlation data, and estimates the COD concentration in the wastewater. The control unit 30 acquires time-dependent changes in the COD concentration in the wastewater that has flowed into the biological treatment unit 3, based on the COD concentration measured in the COD meter 31 and the COD concentration estimated from the absorbance measured in the UV meter 32. If the COD meter 31 and the UV meter 32 are used together as in the present embodiment, more detailed time-dependent changes in the COD concentration can be acquired.

The control unit 30 may calculate the moving average or regression estimate of the COD concentration from the acquired time-dependent changes in the COD concentration.

In the moving average, an average value of a measurement value at an arbitrary point of time of measurement and measurement values at a plurality of points of time of measurement immediately before the arbitrary point of time of measurement is defined as a measurement value at the arbitrary point of time of measurement.

Either linear regression estimation or quadratic regression estimation can be used as the regression estimation. In the regression estimation, a linear regression equation or a quadratic regression equation of a measurement value at an arbitrary point of time of measurement and measurement values at a plurality of points of time of measurement immediately before the arbitrary point of time of measurement is created, and a measurement value at the arbitrary point of time of measurement is estimated from the regression equation. The methods of the regression estimation are not limited to these, and polynomial regression estimation, such as cubic regression estimation or the like, exponential index regression estimation, logarithmic regression estimation, and power regression estimation may be used depending on the characteristics of the wastewater.

In the present embodiment, the control unit 30 acquires, for example, a moving average of COD concentrations at four points of time of measurement. Otherwise, the control unit 30 creates, for example, a regression equation of COD concentrations at four points of time of measurement, and acquires a regression estimate.

The flow meter 33 measures a flow rate (first flow rate) $F_1$ of the wastewater, which flows through piping on the inlet side of the membrane-separated activated sludge treatment device 10, at every predetermined time. The flow meter 35 measures a flow rate (a second flow rate) $F_2$ of the wastewater, which flows through piping on the inlet side of the biofilm treatment device 20, at every predetermined time. The first flow rate $F_1$ and the second flow rate $F_2$ have almost the same measurement intervals as the UV meter 32. The measured first flow rate $F_1$ and second flow rate $F_2$ are transmitted to the control unit 30.

The control unit 30 acquires the first flow rate $F_1$ and the second flow rate $F_2$. The control unit 30 calculates a total $F_t$ of the first flow rate $F_1$ and the second flow rate $F_2$ as a total flow rate of the wastewater that has flowed into the biological treatment unit 3. The control unit 30 acquires time-dependent changes in the total flow rate of the wastewater. In addition, as for the flow rates, the moving average or the regression estimate may not be necessarily calculated from the acquired time-dependent changes.

The control unit 30 calculates and acquires COD load quantity L from the COD concentration and the total flow rate $F_t$ that are measured at the same time. The COD load quantity L is COD absolute quantity per unit time, and is defined by the product of the COD concentration and the flow rate $F_t$.

The COD concentration used for the calculation of the COD load quantity may be a value acquired from the aforementioned time-dependent changes in the COD concentration, or may be the moving average or regression estimate of the COD concentration. Otherwise, the moving average and the regression estimate of the COD concentration may be combined together. For example, the control unit 30 refers to the time-dependent changes in the COD concentration, the moving average of the COD concentration, and the regression estimate of the COD concentration. The regression estimate is adopted for the calculation of the COD load quantity when the COD concentration always increases or decreases at a measurement point where the moving average and the regression estimate are acquired, and the moving average is adopted for the calculation of the COD load quantity when the COD concentration fluctuates. If the moving average or the regression estimate is used for the calculation of the COD load quantity, the measurement error of the COD meter or the UV meter can be made small, and stable control can be performed.

The control unit 30 stores a threshold value of the COD load quantity L for determining the distribution ratio of the wastewater to the membrane-separated activated sludge treatment device 10 and the biofilm treatment device 20 in advance. One or a plurality of threshold values of COD load quantity can be set according to the properties of the wastewater. The threshold value of the COD load quantity is a value that can be appropriately changed according to the treatment conditions of the wastewater.

The control unit 30 stores the design load of the membrane-separated activated sludge treatment device 10 and the design load of the biofilm treatment device 20 in consideration of the maximum COD quantity in design of the biological treatment unit 3.

When the total COD treatment quantity (the design load of the biological treatment unit 3) of the biological treatment unit 3 is 1, the rate of the design load of the membrane-separated activated sludge treatment device 10 and the design load of the biofilm treatment device 20 is X:1−X. The above rate is set in consideration of treatment costs and the performance of the respective treatment devices. That is, if the treatment costs are taken into consideration, the membrane-separated activated sludge treatment device is advantageous compared to the biofilm treatment device. However, the treatment capacity followability of the biofilm treatment device when load fluctuations is large is higher. In consideration of these, it is preferable to set the ratio of the design load within a range of membrane-separated activated sludge treatment device:biofilm treatment device=90:10 to 50:50.

A method of treating wastewater when one threshold value of the COD load quantity is provided will be described below. When one threshold value is provided, it is effective when water quality fluctuations are relatively small and there are no fluctuations of the COD load quantity that greatly exceeds the design load of the membrane-separated activated sludge treatment device 10.

The control unit 30 stores a threshold value $L_1$. The threshold value $L_1$ is determined based on the design load of the membrane-separated activated sludge treatment device 10.

The threshold value $L_1$ is the COD load quantity obtained by multiplying the design load of the membrane-separated activated sludge treatment device 10 by a certain rate. For example, the threshold value $L_1$ is a value within a range of a value obtained by multiplying the design load of the membrane-separated activated sludge treatment device 10 by a constant rate (from 10% to 50%). Generally, the threshold value $L_1$ is a value of 20% of a design load.

The control unit 30 compares the acquired COD load quantity L with the threshold value $L_1$.

When the COD load quantity is equal to or smaller than the threshold value ($L \leq L_1$), the control unit 30 closes the valve 36 and stops the supply of the wastewater to the biofilm treatment device 20. The operation of the biofilm treatment device 20 is stopped. The control unit 30 adjusts the opening degree of the valve 34, and the whole quantity of the wastewater that has flowed into the biological treatment unit 3 is supplied to the membrane-separated activated sludge treatment device 10. Accordingly, stable wastewater treatment in the membrane-separated activated sludge treatment device 10 is maintained.

When the COD load quantity is larger than the threshold value $L_1$ ($L > L_1$), the control unit 30 opens the valve 36. The control unit 30 distributes the wastewater that has flowed into the biological treatment unit 3 to the wastewater supplied to the membrane-separated activated sludge treatment device 10 and the wastewater supplied to the biofilm treatment device 20 in a predetermined ratio.

The distribution ratio (the ratio of $F_1'$ and $F_2'$) of the wastewater in case of $L > L_1$ is the rate (X:1−X) of the design load of the membrane-separated activated sludge treatment device 10 and the design load of the biofilm treatment device 20. For example, when the rate of the design loads is X:1−X=80:20, the wastewater that flows into the biological treatment unit 3 is distributed at a rate of $F_1':F_2'=80:20$.

The control unit 30 stores the value of the first flow rate $F_1'$ and the second flow rate $F_2'$ obtained when $L > L_1$ is established in advance. In addition, $F_1'$ and $F_2'$ are values that satisfy the aforementioned predetermined ratio. The control unit 30 compares the first flow rate $F_1'$ stored in advance with the present first flow rate $F_1$. The control unit 30 adjusts the opening degree of the valve 34 so as to satisfy $F_1=F_1'$. The control unit 30 compares the second flow rate $F_2'$ stored in advance with the present second flow rate $F_2$. The control unit 30 adjusts the opening degree of the valve 36 so as to satisfy $F_2=F_2'$.

A method of treating wastewater where two threshold values of the COD load quantity are provided will be described below as an example.

The control unit 30 stores a first threshold value $L_1$ and a second threshold value $L_2$. The first threshold value $L_1$ and the second threshold value $L_2$ are determined based on the design load of the membrane-separated activated sludge treatment device 10.

The first threshold value $L_1$ is the same value as that in the aforementioned case where one threshold value is provided. That is, the first threshold value $L_1$ is, for example, within a range of a value obtained by multiplying the design load of the membrane-separated activated sludge treatment device 10 by a constant rate (from 10% to 50%).

The second threshold value $L_2$ is determined based on the design load of the membrane-separated activated sludge treatment device 10. An upper limit of the second threshold value $L_2$ is the maximum treatment capacity of the membrane-separated activated sludge treatment device 10. A lower limit of the second threshold value $L_2$ is a value obtained by considering the treatment capacity of the biofilm treatment device 20. Specifically, the second threshold value $L_2$ is a value within a range of 80% or more and 125% or less of the design load of the membrane-separated activated sludge treatment device 10.

The control unit 30 compares the acquired COD load quantity L with the first threshold value $L_1$ and the second threshold value $L_2$.

When the COD load quantity is equal to or smaller than the first threshold value ($L \leq L_1$), as described above, the control unit 30 closes the valve 36 and stops the operation of the biofilm treatment device 20. The control unit 30 adjusts the opening degree of the valve 34, and the whole quantity of the wastewater that has flowed into the biological treatment unit 3 is supplied to the membrane-separated activated sludge treatment device 10.

When the COD load quantity is larger than the first threshold value and equal to or smaller than the second threshold value ($L_1 < L \leq L_2$), the control unit 30 distributes the wastewater that has flowed into the biological treatment unit 3 to the wastewater supplied to the membrane-separated activated sludge treatment device 10 and the wastewater supplied to the biofilm treatment device 20 in a predetermined ratio.

The distribution ratio (the ratio of $F_1'$ and $F_2'$) of the wastewater is the rate (X:1−X) of the design load of the membrane-separated activated sludge treatment device 10 and the design load of the biofilm treatment device 20. For example, when the rate of the design loads is X:1−X=80:20, the wastewater that flows into the biological treatment unit 3 is distributed at a rate of $F_1':F_2'=80:20$.

The control unit 30 stores the value of the first flow rate $F_1'$ and the second flow rate $F_2'$ obtained when $L_1 < L \leq L_2$ is established in advance. In addition, $F_1'$ and $F_2'$ are values that satisfy the aforementioned predetermined ratio. The control unit 30 compares the first flow rate $F_1'$ stored in advance with the present first flow rate $F_1$. The control unit 30 adjusts the opening degree of the valve 34 so as to satisfy $F_1=F_1'$. The control unit 30 compares the second flow rate $F_2$' stored in advance with the present second flow rate $F_2$. The control unit 30 adjusts the opening degree of the valve 36 so as to satisfy $F_2=F_2$'.

When the COD load quantity exceeds the second threshold value ($L>L_2$), the control unit 30 supplies the wastewater to the membrane-separated activated sludge treatment device 10, at a flow rate (first flow rate) $F_1$" in which the load of the membrane-separated activated sludge treatment device 10 has a predetermined value. The predetermined value of a load in case of $L>L_2$ is the same as the upper limit of the above-described load range in case of $L_1<L\leq L_2$. That is, the predetermined value is a value within a range of 80% to 125% of the design load of the membrane-separated activated sludge treatment device. The control unit 30 determines the flow rate (first flow rate) $F_1$" at which the load of the membrane-separated activated sludge treatment device 10 have a value within the above range. The control unit 30 compares the stored first flow rate $F_1$" with the present first flow rate $F_1$. The control unit 30 adjusts the opening degree of the valve 34 so as to satisfy $F_1=F_1$".

The control unit 30 determines the flow rate (the second flow rate) $F_2$" of the wastewater supplied to the biofilm treatment device 20 to make the biofilm treatment device 20 treat COD exceeding the predetermined load of the membrane-separated activated sludge treatment device that is determined as described above. The control unit 30 compares the determined second flow rate $F_2$" with the present second flow rate $F_2$. The control unit 30 adjusts the opening degree of the valve 36 so as to satisfy $F_2=F_2$".

By setting the threshold value $L_1$ as above, even if the load fluctuations of the wastewater are smaller than the threshold value $L_1$, stable treatment can be continued without reducing the treatment capacity of the membrane-separated activated sludge treatment device 10. When a load exceeding the threshold value $L_1$ is generated due to the load fluctuations of the wastewater, treatment can be performed following the load fluctuations by distributing the load to the membrane-separated activated sludge treatment device 10 and the biofilm treatment device 20.

The treatment quantity in the membrane-separated activated sludge treatment device 10 is limited by setting the threshold value $L_2$. By adopting the aforementioned process, even if the load of the wastewater that flows into the biological treatment unit 3 exceeds the design load of the membrane-separated activated sludge treatment device 10, the wastewater substantially exceeding the treatment capacity is prevented from flowing into the membrane-separated activated sludge treatment device 10 even at the maximum. Additionally, if a high-load state lasts, the activity of microorganisms increases, and the operation of the membrane-separated activated sludge treatment device 10 under higher load is enabled. Additionally, although the biofilm treatment device 20 is robust against load fluctuations, when there are load fluctuations in the high-load state, there is a probability that unsuitable treated water may be given no matter how load fluctuation followability is high. Therefore, if the threshold value $L_2$ is set to a value larger than 100% of the design load of the membrane-separated activated sludge treatment device 10, the burden of treatment in the biofilm treatment device 20 can be mitigated. By setting the threshold value $L_2$ in this way, stable treatment can be performed and treated water with stable properties can be supplied, even if high-load wastewater has flowed into the biological treatment unit 3.

In the present embodiment, to enhance the followability of treatment to load fluctuations, one or a plurality of intermediate threshold values ($L_N$) may be set between the threshold value $L_1$ and the threshold value $L_2$. The distribution ratio of the wastewater supplied to the membrane-separated activated sludge treatment device 10 and the wastewater supplied to the biofilm treatment device 20 is changed in cases where the COD load quantity is $L\leq L_N$ and $L>L_N$ with the intermediate threshold value $L_N$ as a border. In this case, the distribution ratio is determined so that the ratio of the wastewater supplied to the biofilm treatment device 20 becomes greater when $L>L_N$ rather than when $L\leq L_N$. By adopting the aforementioned process, the followability of treatment to load fluctuations can be enhanced.

Hereinafter, description will be made quantitatively while showing specific examples.

The first threshold value is set to 20%, the second threshold value is set to 125%, and a third intermediate threshold value is set to 80%. A control is made such that the same distribution ratio as that of the two threshold values is adopted up to the first threshold value of 20% and the third intermediate threshold value of 80%, the distribution ratio of exceeded portions is set to 50:50 if the load quantity exceeds the third intermediate threshold value, and the distribution ratio is not changed with the distribution of the COD quantity to the membrane-separated activated sludge treatment device 10 as an upper limit if the load quantity exceeds the second threshold value.

Stable treatment is maintained if the membrane-separated activated sludge treatment device 10 has a load up to about 120% of a design load. Stable treatment is maintained even with slight deterioration, if the biofilm treatment device 20 has a load up to about 3 times a design load. Although COD can usually be treated 90% or more in the biofilm treatment device 20, COD can be treated 70% or more if the biofilm treatment device has a load up to about 3 times a design load. Taking economical efficiency into consideration, it is desirable to increase the rate of the design load of the membrane-separated activated sludge treatment device 10. In the following quantitative evaluation, the evaluation performed when the ratio of distribution to the membrane-separated activated sludge treatment device 10 and the biofilm treatment device 20 is determined in consideration of the fluctuation capability to this load will be described.

If there is no third intermediate threshold value in case of a load of 100%, the COD quantity of treated water of the biofilm treatment device 20 is 100%×0.2×(1−0.7)=6%. At this time, the load of the membrane-separated activated sludge treatment device 10 is 100%×0.8+6%=86%. On the other hand, if there is the third threshold value, the COD quantity of the treated water of the biofilm treatment device 20 is {80%×0.2+(100%−80%)×0.5}×(1−0.7)=7.8%. At this time, the load of the membrane-separated activated sludge treatment device 10 becomes as low as 80%×0.8+(100%−80%)×0.5+7.8%=81.8%, and more stable wastewater treatment is maintained.

If there is no third threshold value $L_3$ in case of a load of 150%, the COD quantity of the treated water of the biofilm treatment device 20 is (150%−100%)×0.3=15%. Hence, the load of the membrane-separated activated sludge treatment device 10 is 100%+15%=115%. On the other hand, if there is the third threshold value $L_3$, the COD quantity of treated water of the biofilm treatment device 20 is {80%×0.2+(125%−80%)×0.5+(150%−125%)}×(1−0.7)=19%. At this time, the load of the membrane-separated activated sludge treatment device 10 is as low as 80%×0.8+(125%−80%)×0.5+19%=105.5%, and more stable wastewater treatment is maintained.

When treatment is performed in the biofilm treatment device 20, the treated water in the biofilm treatment device 20 flows into the membrane-separated activated sludge treatment device 10. The treated water in the biological reactor 11 is discharged from the membrane-separated activated sludge treatment device 10 (biological treatment unit 3) by the pump 13. At this time, the activated sludge, the suspended particles, and the treated water are separated into a solid and a liquid by the separation membrane 12.

The treated water discharged from the biological treatment unit 3 is transported to the desalinization unit 4. Desalination treatment is performed in the desalinization unit 4.

Figure 3:
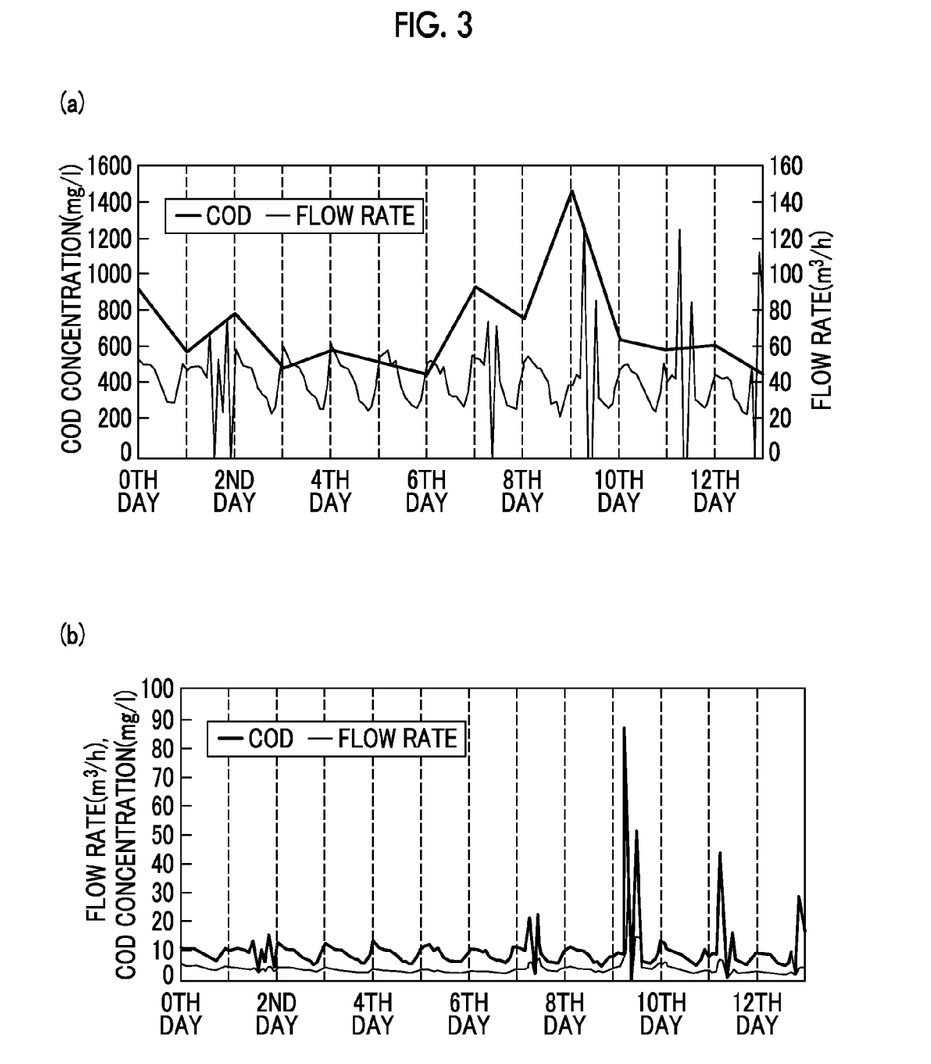

FIG. 3 is a graph showing time-dependent changes in the COD concentration and flow rate when wastewater is treated using the wastewater treatment device of the present embodiment. That is, this graph shows the results obtained when treatment is performed using the membrane-separated activated sludge treatment device and the biofilm treatment device together in the biological treatment unit. FIG. 3(a) shows the COD concentration and the flow rate in the wastewater that has flowed into the biological treatment unit. FIG. 3(b) shows the COD concentration in the treated water of the biofilm treatment device, and the flow rate of the wastewater supplied to the biofilm treatment device. FIG. 3(c) shows the COD concentration in the treated water of the membrane-separated activated sludge treatment device, and the flow rate of the wastewater supplied to the membrane-separated activated sludge treatment device. In FIG. 3, a horizontal axis represents the elapsed time of the wastewater treatment, a first vertical axis represents the COD concentration, and a second vertical axis represents the flow rate.

The measurement intervals of the COD concentration and the flow rate were 15 minutes in the acquisition of FIG. 3. FIG. 3 shows the moving average of the COD concentration. Additionally, the first threshold value $L_1$ was set to 25% of the design load of the membrane-separated activated sludge treatment device, and the second threshold value $L_2$ was set to 125% of the design load. The distribution ratio $F_1":F_2"$ of the wastewater in case of $L_1 < L \leq L_2$ was set to 80:20.

Figure 4:
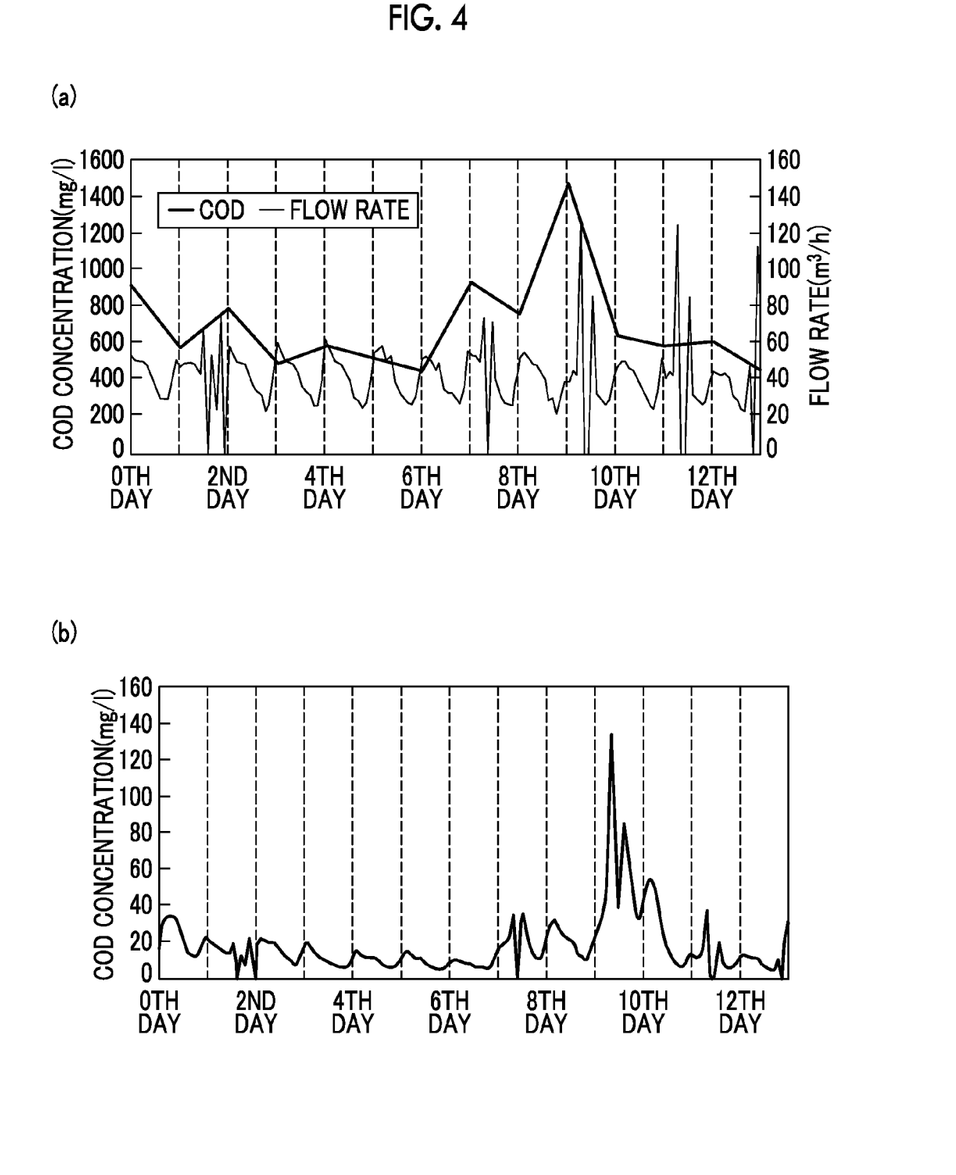

FIG. 4 is a graph showing time-dependent changes in the COD concentration and flow rate when wastewater is treated using only the membrane-separated activated sludge treatment device. FIG. 4(a) shows the COD concentration and the flow rate in the wastewater that has flowed into the biological treatment unit. FIG. 4(b) shows the COD concentration treated in the membrane-separated activated sludge treatment device. In addition, in case of FIG. 4, the amount of the wastewater supplied to the membrane-separated activated sludge treatment device coincides with the amount of the wastewater that has flowed into the biological treatment unit.

In FIG. 3, $L_1 < L \leq L_2$ is established from the $0^{th}$ day to the $9^{th}$ day, and the distribution of the wastewater to the membrane-separated activated sludge treatment device and the biofilm treatment device is performed in a predetermined ratio. As shown in FIG. 3(a), the COD concentration and the flow rate fluctuate greatly from the $9^{th}$ day to the $10^{th}$ day. At this time, $L > L_2$ is established. As shown in FIG. 3(b), the flow rate and COD concentration of the wastewater supplied to the biofilm treatment device fluctuate greatly according to the fluctuations of the COD concentration and the flow rate. On the other hand, as shown in FIG. 3(c), there is no fluctuation in the treatment quantity in the membrane-separated activated sludge treatment device compared to that before the $9^{th}$ day.

Additionally, in FIG. 3, there was no great fluctuation in the COD concentration from the $11^{th}$ day to the $12^{th}$ day, but the flow rate fluctuated. Since $L_1 < L \leq L_2$ was established at this time, the wastewater was distributed in a predetermined ratio.

On the other hand, as shown in FIG. 4, when only the membrane-separated activated sludge treatment device is used, the COD concentration treated in the membrane-separated activated sludge treatment device fluctuates due to the fluctuations of the COD concentration and the flow rate. Particularly, when the COD concentration and the flow rate fluctuate greatly from the $9^{th}$ day to the $10^{th}$ day, the COD concentration in the treated water is 40 mg/l in FIG. 3, whereas the COD concentration is as high as 140 mg/l in FIG. 4.

It can be understood from the above results that wastewater can be stably treated by using the membrane-separated activated sludge treatment device and the biofilm treatment device together, and distributing the wastewater according to the COD load quantity in the wastewater.

REFERENCE SIGNS LIST

1: wastewater treatment device
2: pretreatment unit
3: biological treatment unit
4: desalinization unit
10: membrane-separated activated sludge treatment device (first biological treatment device)
11: biological reactor
12: separation membrane
13: pump
20: biofilm treatment device (second biological treatment device)
21: treatment tank
22: fixed bed
30: control unit
31: COD meter
32: UV meter
33, 35: flow meter
34, 36: valve
40: neutralizing-chemical tank

The invention claimed is:
1. A wastewater treatment device comprising:
a first biological treatment device that treats wastewater by decomposing organic matter through a membrane-separated activated sludge method;
a second biological treatment device that treats wastewater by decomposing organic matter through a biofilm method;
measurement units that measure load concentration and flow rate in the wastewater flowing upstream of the first biological treatment device and the second biological treatment device;
a control unit configured to calculate a load quantity from the load concentration and the flow rate, determine, according to the load quantity, a distribution ratio between a flow rate of the wastewater supplied to the first biological treatment device and a flow rate of the wastewater supplied to the second biological treatment device, and adjust the flow rate of the wastewater supplied to the first biological treatment device and the flow rate of the wastewater supplied to the second biological treatment device, based on the distribution ratio;
a first valve installed on inlet sides of the first biological treatment device and connected to an output unit of the control unit; and a second valve installed on inlet sides of the second biological treatment device and connected to the output unit of the control unit;

wherein the control unit stores a first threshold value, wherein the control unit is configured to adjust the opening degree of the first valve to supply the wastewater to the first biological treatment device and closes the second valve to stop the supply of the wastewater to the second biological treatment device when the load quantity is equal to or smaller than the first threshold value, wherein the control unit is configured to adjust the opening degrees of the first valve and the second valve to supply the wastewater to the first biological treatment device and the second biological treatment device in a predetermined distribution ratio when the load quantity is larger than the first threshold value, and wherein the load quantity is COD or BOD.

2. The wastewater treatment device according to claim 1, wherein the control unit stores the first threshold value and a second threshold value, wherein the control unit adjusts the opening degrees of the first valve and the second valve to supply the wastewater to the first biological treatment device and the second biological treatment device in the predetermined distribution ratio when the load quantity is larger than the first threshold value and equal to or smaller than the second threshold value, and wherein the control unit adjusts the opening degrees of the first valve and the second valve to supply the wastewater to the first biological treatment device so that a load quantity treated in the first biological treatment device reaches a predetermined value and supplies the remaining wastewater to the second biological treatment device when the load quantity is larger than the second threshold value.

3. The wastewater treatment device according to claim 2, wherein the control unit stores one or a plurality of intermediate threshold values between the first threshold value and the second threshold value, and wherein the control unit adjusts the opening degrees of the first valve and the second valve to supply the wastewater to the first biological treatment device and the second biological treatment device in different distribution ratios between case of a load quantity being larger than the intermediate threshold value and case of a load quantity being equal to or smaller than the intermediate threshold value.

4. The wastewater treatment device according to claim 3, wherein the control unit adjusts the opening degree of the second valve to supply the wastewater so that the amount of the wastewater to the second biological treatment device increases whenever the load quantity exceeds the intermediate threshold value.

5. The wastewater treatment device according to claim 1, wherein the wastewater discharged from the second biological treatment device is supplied to the first biological treatment device.

6. The wastewater treatment device according to claim 1, wherein the control unit calculates at least one of a moving average and a regression estimate of the load concentration, and calculates the load quantity using at least one of the moving average and the regression estimate.

7. The wastewater treatment device according to claim 1, wherein the distribution ratio is determined within a range of membrane-separated activated sludge treatment device:biofilm treatment device=90:10 to 50:50.

* * * * *